United States Patent [19]

Elliott et al.

[11] Patent Number: 5,276,813
[45] Date of Patent: Jan. 4, 1994

[54] ACQUIRING ADDRESSES IN AN INPUT/OUTPUT SYSTEM

[75] Inventors: Joseph C. Elliott, Hopewell Junction; Eugene P. Hefferon; Allan S. Meritt, both of Poughkeepsie, all of N.Y.; Martin W. Sachs, Westport, Conn.; Mark C. Snedaker, Vestal, N.Y.

[73] Assignee: International Business Machines Corp., Armonk, N.Y.

[21] Appl. No.: 576,557

[22] Filed: Aug. 31, 1990

[51] Int. Cl.[5] .............................................. G06F 13/00
[52] U.S. Cl. .............................................................. 395/275
[58] Field of Search ................... 395/275, 200; 370/60

[56] References Cited

U.S. PATENT DOCUMENTS

| | | | |
|---|---|---|---|
| 4,155,117 | 5/1979 | Mitchell, Jr. et al. | 395/325 |
| 4,373,181 | 2/1983 | Chisholm et al. | 395/400 |
| 4,608,562 | 8/1986 | Minor et al. | 240/825.59 |
| 4,638,313 | 1/1987 | Sherwood, Jr. et al. | 340/825.52 |
| 4,800,384 | 1/1989 | Snijders | 340/825.52 |
| 4,899,274 | 2/1990 | Hansen et al. | 395/200 |
| 4,922,410 | 5/1990 | Morikawa et al. | 395/275 |
| 4,968,977 | 11/1990 | Chinnaswamy et al. | 340/825.8 |

FOREIGN PATENT DOCUMENTS 2339144 3/1972 Fed. Rep. of Germany .

OTHER PUBLICATIONS

IEEE Transactions on Industrial Electronics and Control Instrumentation, vol. IECI-26, No. 3, Aug. 1989 by Tavora, pp. 151-155, The Remote Link Unit-An Advanced Remote Terminal Concept.
Electronic Engineering, Apr. 1985, pp. 77-80, Silicon and Boards for Multibus II by Sheun et al.
IBM Technical Disclosure Bulletin, vol. 24, No. 5, Oct. 1981, pp. 2626-2628, 'Lock/Unlock', Commands for a Multipath Channel-to-Channel Adapter, by Lowdermilk et al.
IBM Technical Disclosure Bulletin, vol. 16, No. 1, Jun. 1973, pp. 67-68, Rosenberg, "Program Controlled I/O Address Assignment".
IBM Technical Disclosure Bulletin, vol. 20, No. 7, Dec. 1977, pp. 2652-2653, Mitchell, Jr., "Input/Output Device Address Recognition Mechanism".
IBM Technical Disclosure Bulletin, vol. 22, No. 5, Oct. 1979, pp. 2063-2064, Arndt, "Satellite Station Address Assignment Method".
IBM Technical Disclosure Bulletin, vol. 23, No. 8, Jan. 1981, Hill et al., pp. 3564-3565, "Dynamic Device Address Assignment Mechanism".
IBM Technical Disclosure Bulletin, vol. 25, No. 12, May 1983, pp. 6343-6345, Janson et al., "Dynamic Address Allocation in a Local Area Network".

Primary Examiner—Robert L. Richardson
Assistant Examiner—D. Dinh
Attorney, Agent, or Firm—Floyd A. Gonzalez

[57] ABSTRACT

In a computer I/O system including a plurality of link-level facilities and a dynamic switch having a plurality of ports, each link-level facility being attached to an individual one of the ports, a mechanism and method for assigning a unique link level address to each of the link-level facilities. As each of the link-level facilities comes on line, it sends an acquire link address (ALA) frame and waits for a response (ACK) frame. The ALA frame may be addressed to a general to-whom-it-may-concern address and have a source address of who-am-I. Only a dynamic switch normally assigns link addresses. When receiving an ALA frame, the dynamic switch returns an ACK frame having a unique link address assigned to the sender of the ALA frame. Provision is made for determining if there is a dynamic switch present, or, if the link-level facilities are connected together by a static connection through the dynamic switch, for the link-level facility of a channel to assign the unique link addresses.

8 Claims, 5 Drawing Sheets

ACQUIRING ADDRESSES IN AN INPUT/OUTPUT SYSTEM

BACKGROUND OF THE INVENTION

The present invention relates to assigning addresses to devices in a computer input/output (I/O) system, and more particularly relates to I/O devices automatically acquiring addresses in an I/O system.

The need for assigning unique addresses to I/O devices in a computer system is well known. Rosenberg, "Program Controlled I/O Address Assignment", IBM Technical Disclosure Bulletin, Vol. 16, No. 1, June 1973, pages 67-68, discloses dynamically assigning addresses to control units wherein an I/O controller places a reset address on an I/O interface and energizes an I/O Op line. A device attached to the I/O controller responds to the I/O Op line, and the I/O interface supplies the I/O controller with a program assigned address, which is transferred by the controller to the device.

Mitchell, Jr., "Input/Output Device Address Recognition Mechanism", IBM Technical Disclosure Bulletin, Vol. 20, No. 7, December, 1977, pages 2652-2653, discloses an I/O device address recognition mechanism wherein a full device address assignment is initially made or changed dynamically by way of a utility program.

Arndt, "Satellite Station Address Assignment Method", IBM Technical Disclosure Bulletin, Vol. 22, No. 5, October, 1979, pages 2063-2064, discloses a method wherein a satellite station assigns itself a special address for answering a poll to this address by a master station. After receiving a response to the poll, the master station selects the next available address from a list and issues a command to the satellite address, assigning the selected address to the satellite.

Hill et al, "Dynamic Device Address Assignment Mechanism", IBM Technical Disclosure Bulletin, Vol. 23, No. 8, January, 1981, pages 3564-3565, discloses an assignment mechanism wherein a host processor assigns device addresses to device control units by a SET DEVICE ADDRESS command. This command sets the desired address into a device address register in the first (or next) device control unit.

Janson et al, "Dynamic Address Allocation in a Local Area Network", IBM Technical Disclosure Bulletin, Vol. 25, No. 12, May, 1983, pages 6343-6345, discloses a technique for dynamically assigning unique stations or their individual functions in a local area network wherein the general clock is used to make the addresses unique.

U.S. Pat. No. 4,155,117 issued May 15, 1979 to Mitchell, Jr. et al for "Synchronizing Channel-to-Channel Adapter" discloses a channel-to-channel adapter capable of enabling communication between more than two data processors wherein device addresses are selected in advance and reserved for communication with the disclosed channel-to-channel adapter.

U.S. Pat. No. 4,373,181 issued Feb. 8, 1983 to Chisholm et al for "Dynamic Device Address Assignment Mechanism for a Data Processing System" discloses a peripheral device address assignment mechanism in which a unique I/O command on the processor I/O bus loads the device address into a loadable device address register is each peripheral device control unit.

U.S. Pat. No. 4,608,562 issued Aug. 26, 1986 to Minor et al for "Address Personalization for a Remotely Attached Device" discloses a data transmission system wherein the polarization of a serially transmitted test signal and a locally generated control signal are used to provide unique addresses for identical devices connected to a transmitting unit.

U.S. Pat. No. 4,638,313 issued Jan. 20, 1987 to Sherwood, Jr. et al for "Addressing for a Multipoint Communication System for Patient Monitoring" discloses a method for dynamically assigning addresses to new modules as they are coupled to a communication system with a synchronous data link control bus controlled by a primary station wherein the primary station sends the module a packet which assigns the module with the next available address.

U.S. Pat. No. 4,800,384 issued Jan. 24, 1989 to Snijders for "Arrangement for Identifying Peripheral Apparatus Such as Workstations, Printers and Such Like, Which Can Optionally Be Connected in Geographically Different Locations to a Communication Network by Means of Local Coupling Units" discloses a module coupling unit which functions as an interface between a communication unit or peripheral apparatus and a communications network and which includes a code word signal generator for generating a unique address code which is stored in the coupling unit and which can be read and transferred to a diagnostic module for determining the geographical address of a communications unit in which a disturbance has occurred.

U.S. Pat. No. 4,922,410 issued May 1, 1990 to Morikawa et al for "Input/Output System Capable of Allotting Addresses to a Plurality of Input/Output Devices" discloses an input/output processing system including a plurality of channels connected to each of a plurality of input/output control devices and a memory unit for storing information representing the address of each of the control devices in association with the identification number of the channel connected to the control devices. The channel for data transfer is selected upon evoking a request from a central processing unit whereupon the information representing the address of the controller device is read out from the memory unit and the address of the control device is generated on the basis of the information thus read out.

SUMMARY OF THE INVENTION

Prior art addressing schemes do not provide for configurations in which a switch is included between a device or its control unit and, for instance, a channel which typically assigns addresses to the device or its control unit. The addition of a switch causes certain complications because the channel does not know if a device control unit to which it is dynamically connected was previously assigned an address by another channel. In the present invention, each channel and device control unit includes a link-level facility. Each link-level facility requests that it be assigned a link address, and a dynamic switch, if present between the channel and the control unit, then assigns the link addresses. If a dynamic switch is not present, or if the channel and the control unit are connected by a static connection through the switch, then the channel is responsible for assigning link addresses to itself and the connected control unit.

The present invention relates to a computer I/O system including a plurality of link-level facilities and a dynamic switch having a plurality of ports, each link-level facility being attached to an individual one of the ports. Disclosed is a mechanism for assigning a unique link address to each of the link-level facilities.

It is therefore an object of the present invention to provide a mechanism for assigning a unique link address to each of the link-level facilities connected to a dynamic switch.

It is a further object of the present invention to provide a mechanism wherein, as a link-level facility is connected to a dynamic switch, the link-level facility generates a frame requesting that the dynamic switch assign the newly connected link-level facility with a unique address.

It is a further object of the present invention to provide a link-level facility which recognizes frames received over a link after issuing an acquire link address frame. After receiving a frame in response to sending an acquire link address frame, the link-level facility determines if its link is connected to a dynamic switch, and takes appropriate action.

It is a further object of the present invention to provide a mechanism for assigning a unique link address to a link-level facility which is newly connected to a dynamic switch wherein the link-level facility issues an acquire link address frame addressed to-whom-it-may concern with a request asking who-am-I. The dynamic switch responds with a frame which includes the address of the newly connected link-level facility with the address of the dynamic switch in a source address field.

The foregoing and other objects, features and advantages of the invention will be apparent from the following more particular description of the preferred embodiment of the invention as illustrated in the drawings.

DESCRIPTION OF THE PREFERRED EMBODIMENT

Figure 1:
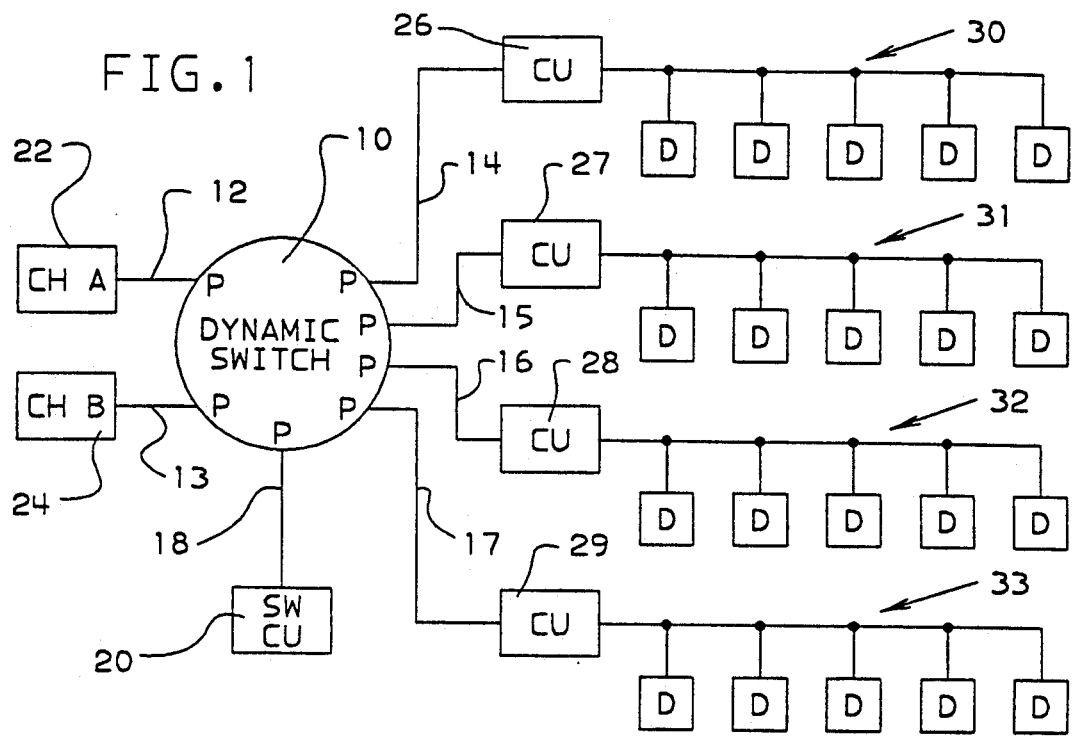
FIG. 1 is a block diagram of an I/O system usable with the present invention, the I/O system having channels connected to control units through a dynamic switch.

FIG. 1 is a block diagram of the I/O system of a data processing system for making dynamic connections between the channel subsystem of the data processing system and control units. The I/O system includes a dynamic switch 10 having a plurality of ports P, each port P attached to one end of a plurality of links 12-18. One of the links 18 is attached to a dynamic-switch control unit 20, and each of the other links 12-17 is attached to either a channel, such as channel A designated 22 or channel B designated 24, or to one of the control units 26-29. Each of the control units 26-29 control a plurality 30-33 of peripheral devices D, respectively.

Each of the channels 22 and 24 is a single interface on a channel subsystem, such as, for instance, an ESA/370 channel subsystem. The channels 22 and 24 direct the transfer of information between I/O devices of the pluralities 30-33 of devices D and main storage (not shown) of the data processing system and provide the common controls for the attachment of different I/O devices D by means of a channel path (to be defined). The channels 22 and 24 are channels wherein data is transmitted and received in a frame, as will be explained.

Each of the links 12-17 is a point-to-point pair of conductors that may physically interconnect a control unit and a channel, a channel and a dynamic switch (such as links 12 and 13), a control unit and a dynamic switch (such as links 14-17), or, in some cases, a dynamic switch and another dynamic switch. The two conductors of a link provide a simultaneous two-way communication path, one conductor for transmitting information and the other conductor for receiving information. When a link attaches to a channel or a control unit, it is said to be attached to the I/O interface of that channel or control unit. When a link is attached to a dynamic switch, it is said to be attached to a port P on that dynamic switch. When the dynamic switch makes a connection between two dynamic-switch ports, the link attached to one port is considered physically connected to the link attached to the other port, and the equivalent of one continuous link is produced for the duration of the connection.

The dynamic switch 10 provides the capability to physically interconnect any two links that are attached to it. The link attachment point on the dynamic switch 10 is the dynamic-switch port P. Only two dynamic-switch ports P may be interconnected in a single connection, but multiple physical connections may exist simultaneously within the same dynamic switch. The dynamic switch 10 may be constructed as disclosed in U.S. Pat. Nos. 4,605,928; 4,630,045; and 4,635,250. In one preferred embodiment, the dynamic switch 10 is a double sided switch, that is a two-sided cross-point switch, as described in the background of the aforementioned U.S. Pat. No. 4,635,250. The interconnection of two dynamic-switch ports P established by the dynamic switch 10 does not affect the existing interconnection of any other pair of dynamic-switch ports, nor does it affect the ability of the dynamic switch to remove those connections.

When a connection is established, two dynamic-switch ports and their respective point-to-point links are interconnected by a switch matrix within the dynamic switch 10, as explained in the aforementioned switch patents, such that the two links are treated and appear as one continuous link for the duration of the connection. When frames are received by one of two connected switch ports P, the frames are normally passed from one port to the other for transmission on the other port's link.

The dynamic switch 10 can form a connection between two ports P in one of two ways: dynamic or static. The connection is termed a dynamic connection or static connection, accordingly.

The dynamic switch 10 can establish or remove a dynamic connection between two ports P based on the information provided by certain frame delimiters in the serial frames transmitted over the links and based on conditions present at each of these ports P as disclosed in copending U.S. Pat. No. 5,107,489 issued Apr. 21, 1992 entitled "Switch and Its Protocol for Making Dynamic Connections".

The dynamic switch can establish or remove a static connection between two ports P as a result of commands received by means of the local or remote facilities of the dynamic-switch control unit 20. Frame delimiters or other sequences received at the port P have no effect on the static connection.

When a static connection exists between two ports P, the ports are in the static state. The static state is not affected by any information received from the link or from the statically connected port. If a sequence (to be explained) is received by one of two statically connected ports, the received sequence is normally retransmitted on the connected port's link. Frames may be received and transmitted simultaneously by statically connected ports.

Figure 2:
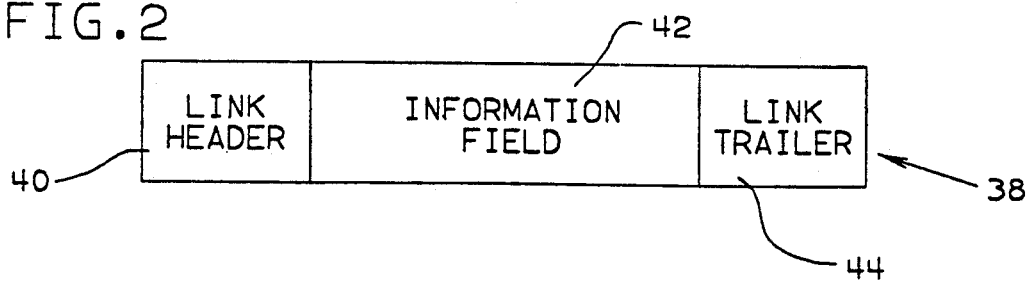
FIG. 2 is a diagrammatic representation of a frame sent over the I/O system of FIG. 1.

As previously mentioned, information is transferred on the serial-I/O interface in a frame. A frame is a unit of information that is sent or received according to a prescribed format. This format delineates the start and end of the unit of information and prescribes the placement of the information within these boundaries. FIG. 2 shows the basic frame format 38 which consists of a fixed-length link-header field 40, a variable-length information field 42, and a fixed-length link-trailer field 44.

Communications using the switch are governed by link-level protocols which provide for making the connection through the dynamic switch 10 and for other control functions. Each channel and each control unit contains a link-level facility, which is the embodiment of the link protocols.

As will be explained, each link-level facility is assigned a unique address, called the link address. The assignment of a link address to a link-level facility occurs when the link-level facility performs initialization. Every frame sent through the switch contains link-level addressing which identifies the source and destination of the frame. Specifically, this addressing information consists of the link addresses of the sending link-level facility (source link address) and receiving link-level facility (destination link address). The switch uses this addressing information in order to make a connection from the port receiving the frame to the correct port for sending the frame to the specified destination.

Figure 3:
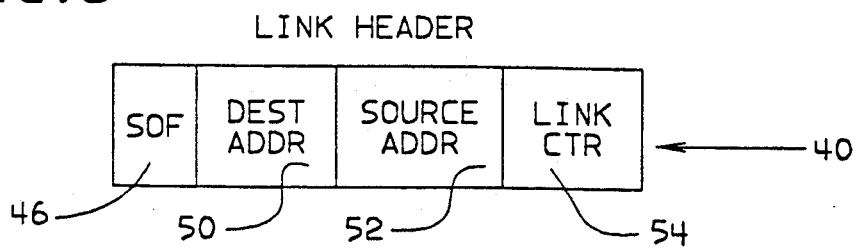
FIG. 3 is a diagrammatic representation of a link header of the frame of FIG. 2.
Figure 4:
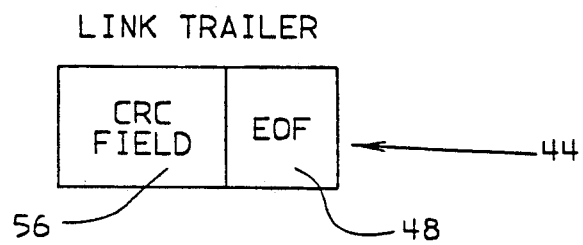
FIG. 4 is a diagrammatic representation of a link trailer of the frame of FIG. 2.

FIG. 3 shows a link header 40, and FIG. 4 shows a link trailer 44. Every frame is bounded by a start-of-frame (SOF) delimiter 46 which is found in the link header 40, and an end-of-frame (EOF) delimiter 48, which is found in the link trailer 44. Frame delimiters 46 and 48 are composed of combinations of special transmission characters which do not have equivalent data codes. In the preferred embodiment, the transmission codes used are those disclosed in U.S. Pat. No. 4,486,739 issued Dec. 4, 1984 to Franaszek et al. for Byte Oriented DC Balanced (0.4) 8B/10B Partitioned Block Transmission Code, owned by the assignee of the present invention. The information contained between the frame delimiters 46 and 48 consist of data characters which have equivalent eight-bit codes as explained in the aforementioned Franaszek et al. patent.

In addition to the SOF 46, the link header 40 of FIG. 3 includes a destination-address field 50, a source-address field 52, and a link-control field 54.

As previously mentioned, the SOF 46 is a special string of transmission characters that cannot appear in the contents of an error-free frame. There are two types of SOF delimiters, the connect-SOF (CSOF) delimiter, which is used as an initiate connection control to initiate the making of a dynamic connection, and passive-SOF (PSOF) delimiter, which causes no action with respect to making a dynamic connection.

The destination-address field 50 is the first field of the contents of a frame and immediately follows the SOF delimiter 46. The destination-address field 50 identifies the link-level facility of a channel or control unit that is the destination for the frame, and is used to route the frame to the link-level facility that is the intended receiver. The destination link address 50 is used to determine which physical connection is to be made, and the destination to which the frame is to be routed through the dynamic switch 10. If no connection exists, that is, if the port P is in the inactive state, and no busy or port-reject conditions are present, the connection is made and the frame is routed to the destination port.

The source-address field 52 immediately follows the destination address field 50, and identifies the sending link-level facility.

A link-level facility provides its identity as the source of a frame by inserting its assigned link address in the source-address field 52 of any frame that it sends. After a frame is received with a valid source address 52, the source address 52 is used in most cases as the destination address in any subsequent response frame or future request frame to the same link-level facility.

The link-control field 54 indicates the type and format of the frame. In the preferred embodiment of the present invention, the contents of the link-control field 54 indicates if the present frame is an assign-link-address (ALA) frame or an acknowledge (ACK) frame sent in response to an ALA frame or other request frame. The link-control field 54, which is the last field of the link header 40, immediately follows the source-address field 52.

The information field 42 is the first field following the link header 40. The size of the information field depends on the function performed by the particular frame. A reason code, for instance, is transmitted in the information field 42 of response frames.

The link trailer 44 of FIG. 4 includes a cyclic-redundancy-check (CRC) field 56 just before the EOF delimiter 48. The CRC field 56 contains a redundancy-check code that is used by the receiving link-level facility to detect most frame errors which affect the bit integrity of a frame. The address 50 and 52, link-control 54 and information 42 fields are used to generate the CRC 56 and are, therefore, protected by the CRC 56.

The end-of-frame (EOF) delimiter 48 is the last string of transmission characters of a frame. Again, it is a specific sequence of transmission characters that cannot appear in the contents of an error-free frame. When the EOF delimiter 48 is encountered during the reception of a frame, it signals the end of the frame and identifies the two transmission characters immediately preceding the EOF delimiter 48 as the CRC 56 at the end of the contents of the frame. The EOF delimiter 48 also indicates the extent of the frame for purposes of any applicable frame-length checks.

There are two types of EOF delimiters 48, the disconnect-EOF (DEOF) delimiter, which is used to initiate the removal of a dynamic connection, and the passive-EOF (PEOF) delimiter, which causes no action with respect to removing a dynamic connection.

Idle characters are sent over the links when frames are not being transmitted. These idle characters, which are special characters not having data values, are used for maintaining the links in synchronism. Sequences of special idle characters are also transmitted to provide limited communication of special control functions such as indications of off-line and malfunction conditions. These special sequences are not part of the present invention, and will not be discussed further.

The link-level facilities of the control units 26-29 and the channels 22 and 24 each include apparatus for receiving frames and for generating frames. The apparatus for receiving frames may be as described in copending U.S. Pat. No. 5,025,257 issued Jun. 18, 1991 for "Apparatus for Decoding Frames From a Data Link", and the apparatus for generating frames may be as described in U.S. application Ser. No. 428,798 for "Apparatus for Constructing Data Frames Over a Data Link", both owned by the assignee of the present invention.

In the I/O system of the present invention, each link-level facility in the system sends an ALA frame to the dynamic switch 10 requesting that it be assigned a unique link address. Upon receipt of an ALA frame, the dynamic switch 10 assigns a unique link address, and returns an ACK frame to the requesting link-level facility with its assigned link address in the destination address field 50 of the ACK frame. In the present embodiment, the dynamic switch control unit 20 performs the function of assigning unique link addresses for the dynamic switch 10. However, other embodiments may be envisioned wherein the dynamic switch 10, or its individual ports P may assign the unique link addresses.

If a dynamic switch 10 is not present, a control unit link-level facility receiving an ALA frame returns a link-level reject frame, while a channel link-level facility receiving such an ALA frame returns a link-level busy or ACK frame. A channel link-level facility receiving such a link-level reject frame knows that a control unit is attached, and goes into an address assigning routine such as one of the routines known in the prior art, and assigns unique link addresses to itself and the control unit. However, if the link-level facility receiving a response of a link-level busy frame, is a control unit link-level facility, it knows that a channel is attached and that the channel will assign its link address. These procedures will be discussed in connection with FIGS. 5-8.

Figure 5:
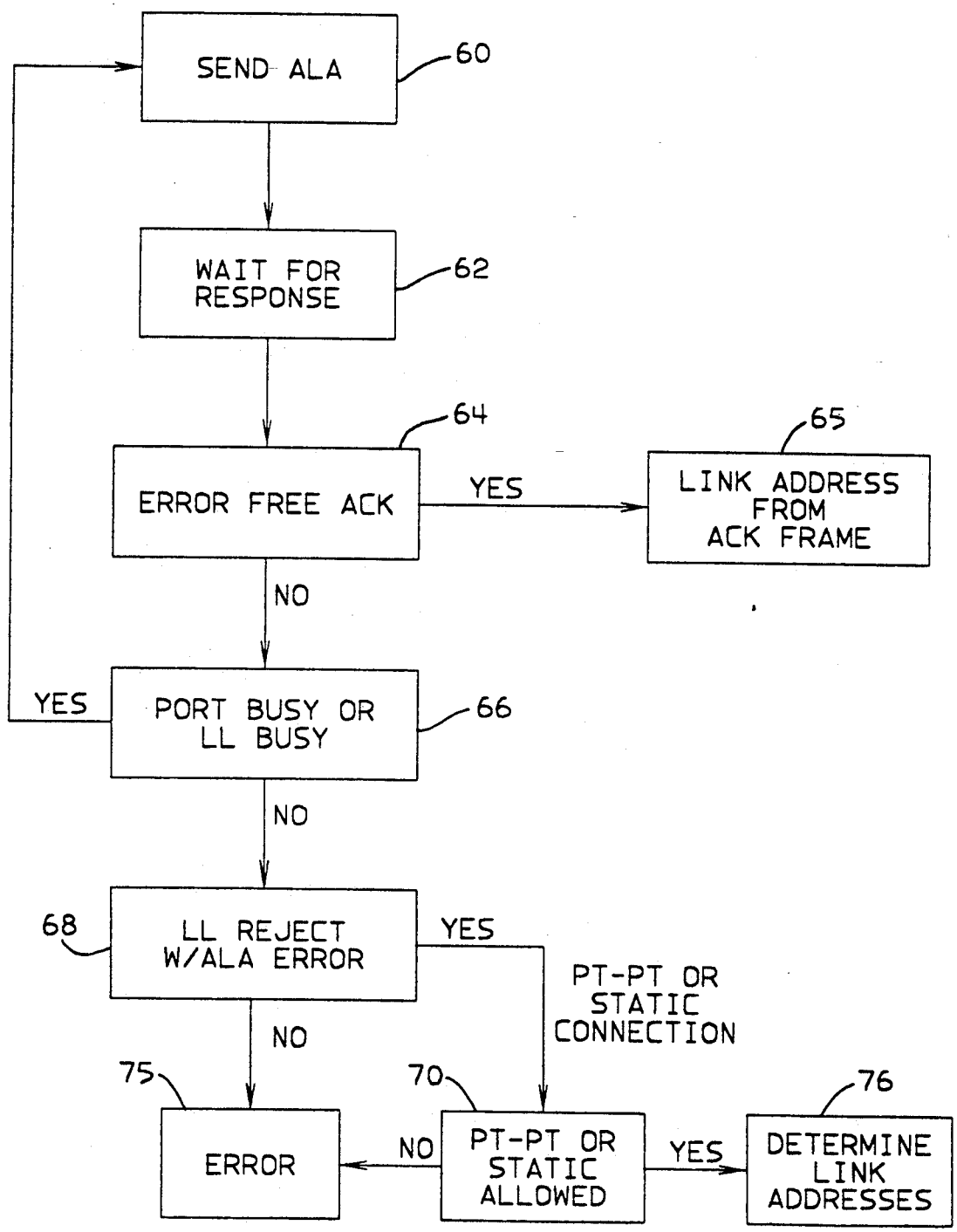
FIG. 5 is a flow chart showing the operation of a link-level facility in a channel of FIG. 1 during the acquire-link-address procedure.

FIG. 5 is a flow chart showing the operation of a link-level facility in a channel during the acquire-link-address procedure. At 60, the channel sends a ALA frame requesting that it be assigned a link address. At 62, the channel waits for a response to its ALA frame. If the response, as determined at 64, is an error free ACK frame, the channel knows that a dynamic switch 10 is attached and accepts and stores as its link address, the value in the destination address 50 of the ACK frame. This is shown at block 65 at FIG. 5. If the frame sent in response to the ALA frame is not an error free ACK frame, the channel checks at 66 to see if the response frame is a port busy frame or a link-level busy frame. If the check at 66 is yes, the channel returns to block 60 and sends another ALA frame.

If the check at 66 is no, a check is made at 68 to determine if the response frame is a link level reject frame with an ALA error code. If the check at 68 is yes, the channel knows that there is a point-to-point or a static connection present. A point-to-point connection is one wherein the channel is connected directly to a control unit. A static connection is one wherein the channel is connected through a dynamic switch to a control unit, wherein the connection through the dynamic switch is a dedicated or static connection. At 70, a check is made to see if a point-to-point or a static connection is allowed. If the check at 68 determines that the response frame is not a link-level reject frame with an ALA error code, or if the check at 70 indicates that a point-to-point or static connection is not allowed, the channel goes to an error condition at 75. If at 70, the channel determines that a point-to-point or static connection is allowed, the channel determines the proper link addresses for itself and the connected control unit at 76. At this time, the link address for the control unit is maintained in the channel to be sent to the control unit at a later time, as will be discussed in connection with FIG. 7.

Figure 6:
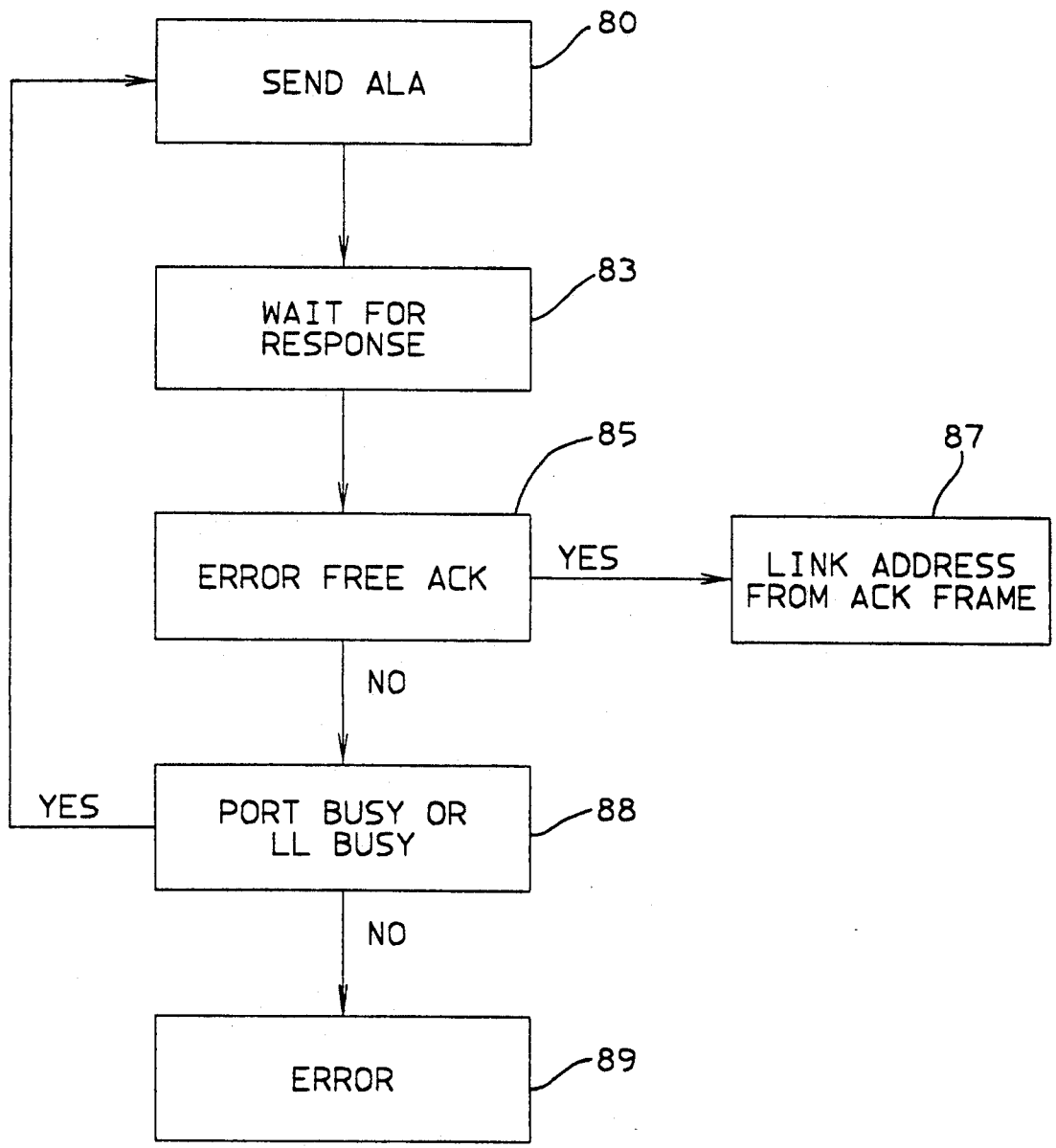
FIG. 6 is a flow chart showing the operation of a link-level facility in a control unit of FIG. 1 during the acquire-link-address procedure.

FIG. 6 is a flow chart showing the operation of a link-level facility in a control unit of the I/O system. At 80, the control unit sends an ALA frame, and at 83 waits for a response to the ALA frame. When a response is received, the control unit checks at 85 to determine if an error free ACK response frame has been received. If an error free ACK response frame has been received at 85, the control unit accepts and stores as its link address the link address in the destination field 50 of the ACK frame, as shown at 87. If the check at 85 determines that the response frame received is not an error free ACK response frame, the control unit at 88 checks to see if the response frame is one of a port busy frame or a link-level busy frame. If the check at 88 is yes, the control unit returns to 80 to send a new ALA frame. If the check at 88 is no, the control unit goes to an error condition as shown at 89.

Figure 7:
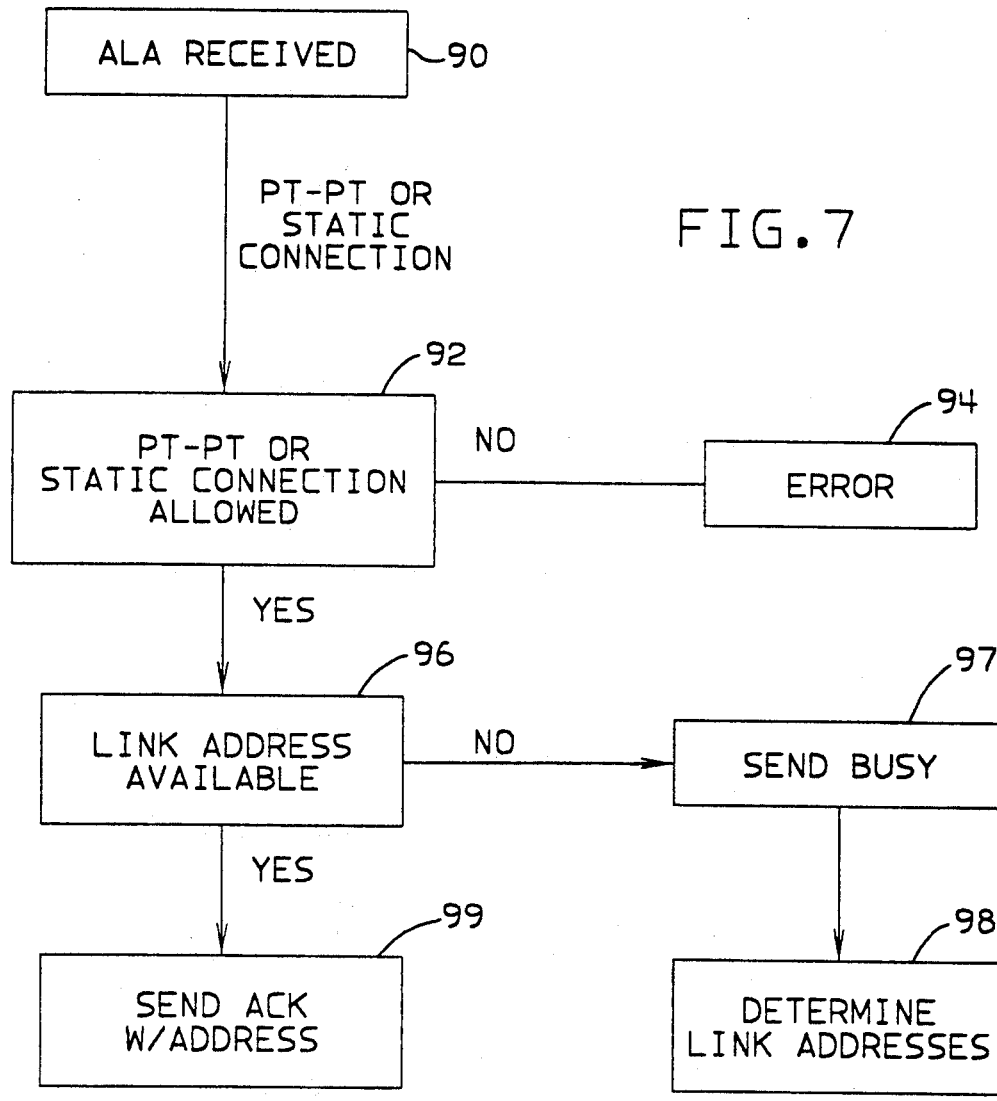
FIG. 7 is a flow chart showing the operation of a link-level facility in a channel of FIG. 1 when the channel receives an unsolicited acquire-link-address request frame.

FIG. 7 is a flow chart showing the operation of a link-level facility in a channel when the channel receives an unsolicited ALA frame. At 90, the channel receives an ALA frame which indicates that a control unit is connected to the channel by either a point-to-point connection or by a static connection through a dynamic switch. A check is made at 92 to see if a point-to-point connection or a static connection is allowed for this channel. If the check at 92 is no, the channel enters an error condition as shown at 94. If the check at 92 is yes, the channel at 96 checks to see if a link address is available. The link address will be available at 96 if, for instance, link addresses were previously determined at 76 of FIG. 5. If a link address is not available at 96, the channel sends a busy response frame at 97 and enters a routine at 98 to determine the link addresses. It will be understood that the routine at 98 may be the same as the routine at 76 wherein the channel determines, such as in the prior art, unique link addresses for the channel and the connected control unit.

If link addresses are available at the check at 96, an ACK response frame is sent at 99 to the control unit with the link address of the control unit in the destination address field 50 of the ACK response frame.

Figure 8:
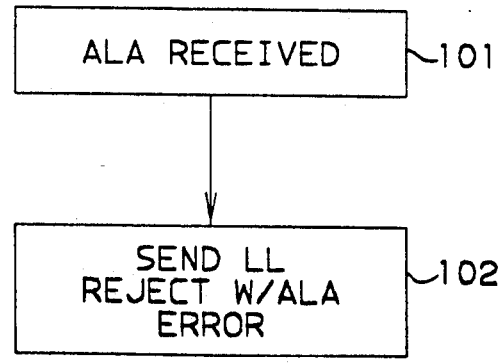
FIG. 8 is a flow chart showing the operation of a link-level facility in a control unit of FIG. 1 when the control unit receives an unsolicited acquire-link-address request frame.

FIG. 8 is a flow chart showing the operation of a link-level facility in a control unit when the control unit receives an unsolicited ALA frame. At 101, the control unit receives an ALA frame which indicates that the control unit is connected by a point-to-point connection or a static connection through a dynamic switch directly to a channel. The control unit sends a link-level reject frame with a ALA error code as shown at 102. This link-level reject frame with an ALA error code will be used by the channel, as shown at 68 of FIG. 5, to cause link addresses to be assigned to the channel and control unit if a point-to-point or static connection is allowed, as previously described.

Figure 9:
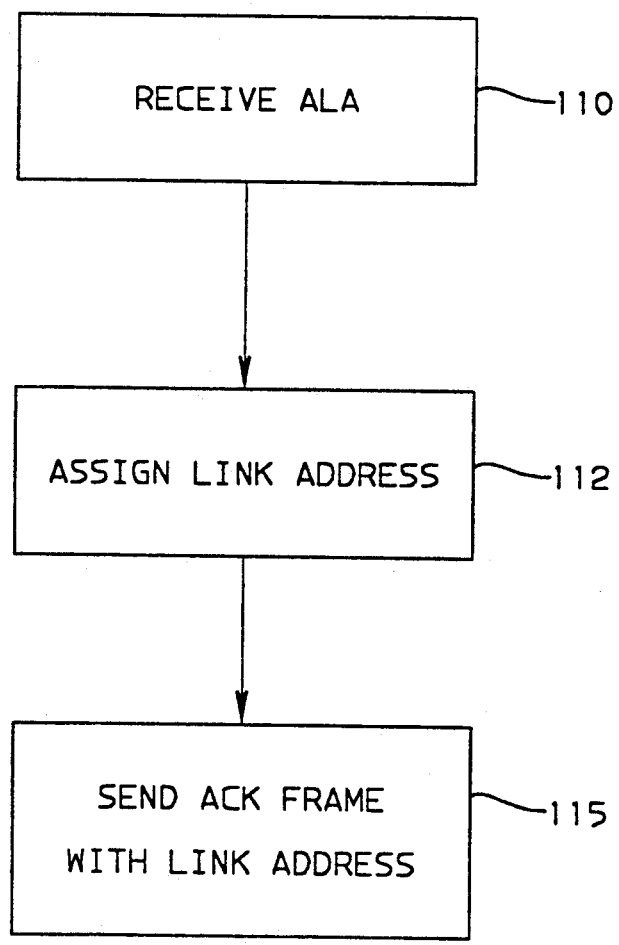
FIG. 9 is a flow chart showing the operation of the dynamic switch of FIG. 1 during the acquire-link-address procedure.

FIG. 9 is a flow chart showing the operation of the dynamic switch during an acquire-link-address procedure. As previously discussed, it will be understood that the flow chart of FIG. 9 may be performed by the dynamic switch control unit 20, or by other elements of the dynamic switch such as the individual ports, as desired. At 110, a port of the dynamic switch 10 receives an ALA frame. At 112, the dynamic switch assigns a link address to the link-level facility sending the ALA frame. In the present embodiment, each switch port has a specific link address associated with it, and the dynamic switch control unit 20 assigns to the link-level facility sending and ALA frame the link address associated with the port to which it is attached. It will be understood that other schemes for determining the link address to be assigned, such as those known in the prior art, may be used, if desired. At 115, an ACK frame is then returned to the requesting link-level facility with its assigned link address in the destination address field 50 of the ACK frame.

The link address of the connected device may be placed in the source address field 52 of the ACK frame to inform the requesting link-level facility who it is connected to. If the requesting link-level facility is a control unit which is connected to a dynamic switch, the source address 52 contains the link address of the dynamic switch control unit 20. If, however, a control unit is connected to a channel, the source address 52 contains the link address of the channel. If a channel is connected to a dynamic switch, the source address 50 contains the link address of the dynamic switch control unit 20. If, however, a channel is connected to a control unit, the frame sent by the control unit would show a link level reject with an ALA error, since control units do not assign link addresses, as discussed in connection with FIG. 8.

In another embodiment, the ALA function may be accomplished by a requesting link-level facility sending a frame having a special to-whom-it-may-concern address in the destination address field 50 and a special who-am-I character in the source address field 52. The ACK frame sent in response to an ALA frame may, in another embodiment, have the assigned link address for the requesting link-level facility in the information field 42.

While we have illustrated and described the preferred embodiment of our invention, it is to be understood that we do not limit ourselves to the precise construction herein disclosed and the right is reserved to all changes and modifications coming within the scope of the invention as defined in the appended claims.

Having thus described our invention, what we claim as new, and desire to secure by Letters Patent is:

1. In a computer I/O system including a plurality of link-level facilities and a dynamic switch having a plurality of ports, each link-level facility being attached to an individual one of said ports, a mechanism for assigning a unique link address to each of said link-level facilities wherein each link-level facility comprises:
   frame generator means for sending an acquire link address (ALA) frame to the dynamic switch via the port to which said link-level facility is attached;
   frame recognition means for receiving a response frame from said dynamic switch via said attached port, said frame recognition means including means for recognizing a response frame from said dynamic switch is response to said ALA frame, said response frame including an assigned link address;
   link-address storing means for storing the assigned link address from said response frame as its unique link address; and
   wherein said plurality of link-level facilities includes a channel link-level facility and a control-unit link-level facility, said channel link-level facility being connected to said control-unit link-level facility by a dedicated static connection through said dynamic switch; and
   said channel link-level facility further comprises:
   reject frame recognition means in its frame recognition means for recognizing a link-level reject frame with an ALA error reason code; and
   address assigning means for assigning a unique link address to said channel link-level facility and said control-unit link-level facility responsive to said reject frame recognition means.

2. The mechanism of claim 1 wherein said channel link-level facility further comprises:
   ALA frame recognition means in its frame recognition means for recognizing an ALA frame;
   determining means for determining if said address assigning means has an assigned unique address for said control-unit link-level facility; and
   means in its frame generating means responsive to said determining means for sending a response frame including said assigned control-unit link-level facility unique address to said control-unit link-level facility.

3. The mechanism of claim 1 wherein said control-unit link-level facility includes means in its frame recognition means for recognizing an ALA frame, and means in its frame generator means for sending a link-level reject with ALA error response frame responsive to the recognition of an ALA frame.

4. The mechanism of claim 3 wherein said channel link-level facility includes means in its frame recognition means for recognizing a link-level reject with ALA error response frame, and said channel link-address assigning means for assigning a unique link address to itself and to said control-unit link-level facility responsive to the recognition of a link-level reject with ALA error response frame.

5. In a computer I/O system including a plurality of link-level facilities and a dynamic switch having a plurality of ports, each link-level facility being attached to an individual one of said ports, said plurality of link-level facilities including a channel link-level facility and a control-unit link-level facility, said channel link-level facility being connected to said control-unit link-level facility by a dedicated static connection through said dynamic switch, a method for assigning a unique link address to each of said link-level facilities comprising:
   sending an acquire link address (ALA) frame to the dynamic switch from an ALA frame generator in one of said link-level facilities via the port to which said one link-level facility is attached;

assigning by an assigning means in said dynamic switch, an assigned unique link address to identify said one link-level facility;

sending said assigned unique link address in a response frame from said dynamic switch to said one link-level facility;

receiving at said one link-level facility, said response frame from said dynamic switch via said attached port in response to said ALA frame, said response frame including said assigned unique link address;

storing in said one link-level facility, the assigned unique link address from said response frame as said one link-level facility's unique link address;

recognizing at said channel link-level facility, an ALA frame;

assigning by said channel link-level facility, a unique link address to said control-unit link-level facility responsive to an ALA frame recognition means in said channel link-level facility for recognizing ALA frames; and sending said response frame from said channel link-level facility to said control-unit link-level facility through said dynamic switch, said response frame including said unique link address.

6. The method of claim 5 further comprising sending said ALA frame from said one link-level facility to said dynamic switch with a general to-whom-it-may-concern destination address for identifying said dynamic switch and having a who-am-I source address for identifying said one link-level facility before a link address is assigned thereto.

7. The method of claim 5 further comprising sending from said dynamic switch to said one link-level facility, said unique link address as a destination address of said response frame.

8. The method of claim 5 further comprising sending from said dynamic switch to said one link-level facility, said unique link address as data in an information field of said response frame.

* * * * *